(No Model.) 2 Sheets—Sheet 1.

A. S. RANLETT.
COTTON BALE COVER.

No. 390,519. Patented Oct. 2, 1888.

Witnesses:
Alex. Bartoff
Jno. E. Parker

Inventor:
Albert S. Ranlett
by his Attorneys
Howson & Howson (No Model.) 2 Sheets—Sheet 2.

A. S. RANLETT.
COTTON BALE COVER.

No. 390,519. Patented Oct. 2, 1888.

Witnesses:
Alv. Barkoff
Jno E. Parker

Inventor
Albert S. Ranlett
by his Attorneys
Howson & Howson

UNITED STATES PATENT OFFICE.

ALBERT S. RANLETT, OF NEW ORLEANS, LOUISIANA.

COTTON-BALE COVER.

SPECIFICATION forming part of Letters Patent No. 390,519, dated October 2, 1888.

Application filed April 26, 1888. Serial No. 271,899. (No model.)

*To all whom it may concern:*

Be it known that I, ALBERT S. RANLETT, a citizen of the United States, residing at New Orleans, Orleans parish, Louisiana, have invented certain Improvements in Cotton-Bale Covers, of which the following is a specification.

One object of my invention is to provide a covering or wrapping for cotton-bales which will serve to effectually protect the cotton while in storage or during transit, and which can be reused indefinitely; and a further object is to so construct the covering or wrapping that it can be used on the bale both before and after the secondary compression of the bale. These objects I attain in the manner hereinafter set forth, reference being had to the accompanying drawings, in which—

Figure 1:
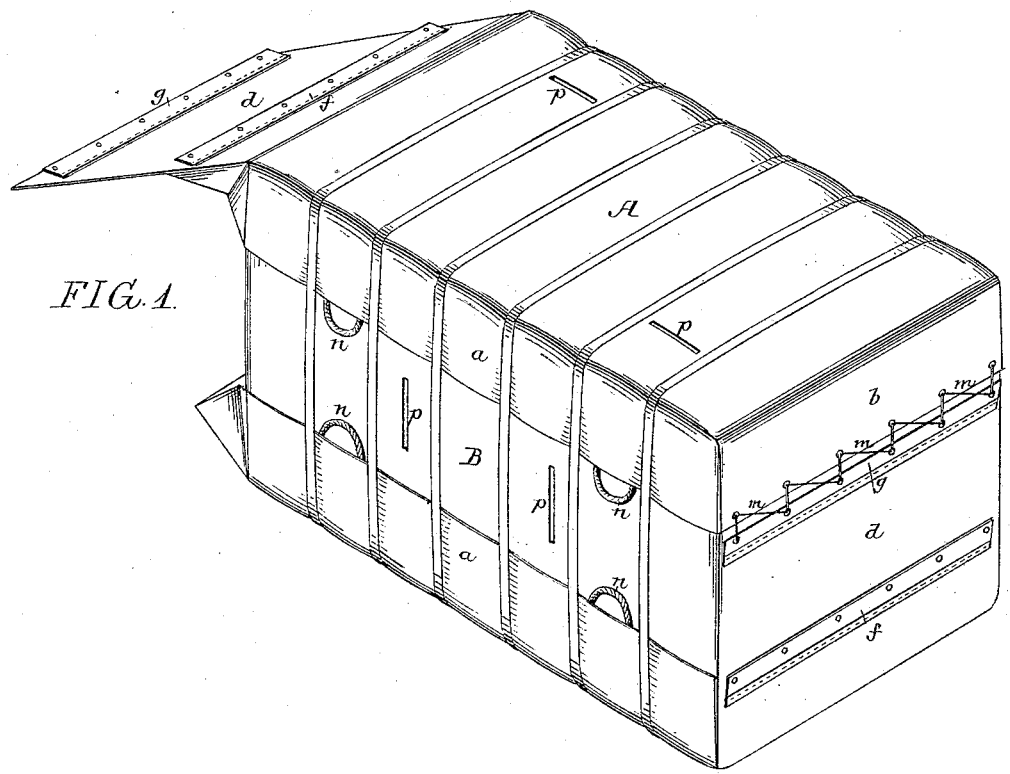
Figure 2:
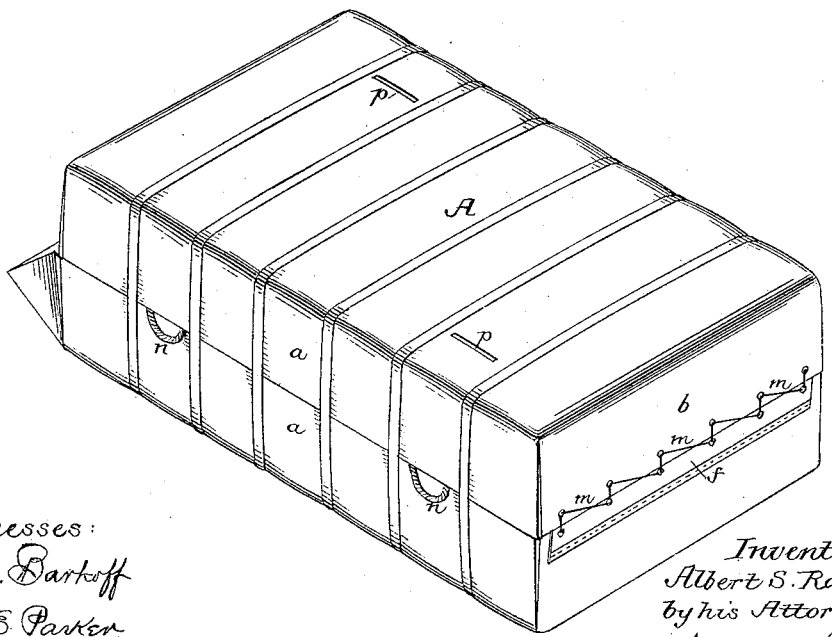

Figure 1 is a perspective view of a cotton-bale provided with a covering or wrapping in accordance with my invention, the covering at one end being shown unfastened and the bale being shown as it appears before compression. Fig. 2 is a perspective view of the bale after compression; and Fig. 3 is a perspective view, on a reduced scale, showing the character of the different pieces comprising the improved covering or wrapping.

The providing of cotton-bales with a covering or wrapping which will protect them from injury by fire or water and from loss in weight when stored or in transit is a desideratum. So far as I am aware, however, the nearest approach to such a covering has been a sheet-metal case or cover, which is objectionable, first, because of its initial expense, and, furthermore, because it is not well calculated to withstand the rough handling to which cotton-bales are subjected, and because it cannot be effectively reused.

In carrying out my invention, therefore, I make the covering for the bale of textile fabric, treated in any of the well-known ways to render it water-proof, and also treated with tungstate of soda or equivalent material to render it fire-proof.

Figure 3:
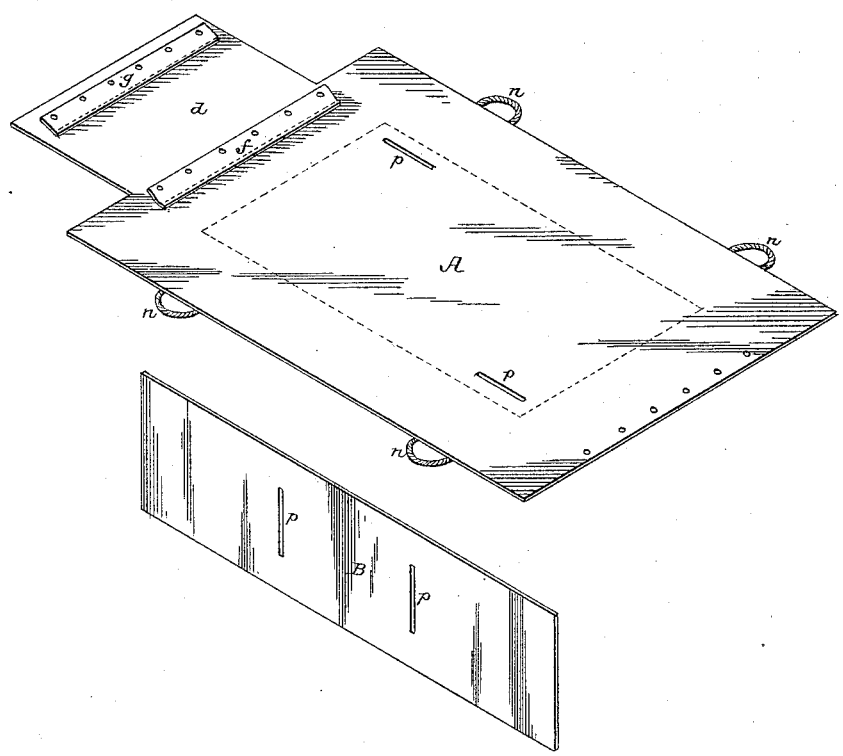

I prefer to make the covering or wrapping in four parts—namely, top and bottom pieces A and opposite side pieces, B, of the character shown in Fig. 2, the top and bottom pieces being both longer and wider than the bale, the length and breadth of which are about as indicated by the dotted lines in Fig. 3. The side pieces, B, are preferably somewhat longer than the bale, so as to wrap over the opposite ends of the same, and are of such width that they will be overlapped by the side flaps or folds, $a$, of the top and bottom pieces A of the covering when applied to the bale, as shown in Fig. 1—that is to say, before the bale has been subjected to the secondary pressing operation, or, as it is termed, "compression." The top and bottom pieces are also folded over the ends of the bale, as shown at $b$, and each piece has at one end a projecting strip, $d$, and is provided with flaps $f$ and $g$, each having lacing-holes $i$, the flap $f$ being on the end fold of the top or bottom piece and the flap $g$ some distance from the outer end of the projecting strip $d$.

In applying the covering to the bale the top and bottom strips occupy reversed positions in respect to each other—that is to say, the projecting strips $d$ of the top and bottom pieces are at opposite ends of the bale. The pieces of the covering being properly applied to the press, the pressing of the bale is effected, and when this pressing has been completed the side folds, $a\ a$, of the top and bottom pieces will overlap the side pieces, B, of the covering, and the end strip, $d$, of the top or bottom piece can be tucked under the end fold, $b$, of the bottom or top piece, the flap $g$ being outside of said fold and the lacing-holes $i$ in said flap coinciding with similar lacing-holes $i$ near the edge of the fold, so that a suitable baling-twine, $m$, can be passed through the lacing-holes of the flap and fold to secure the two together, as shown in Fig. 1. When the bale is compressed by being subjected to the secondary pressing operation, the thickness of the bale is reduced until the folds $a\ a$ overlap and the lacing-holes $i$ in the flaps $f$ join the corresponding lacing-holes $i$ in the folds $b$ and permit the lacing of the parts, as shown in Fig. 2, the end strip, $d$, being disposed under the folds $b$ and the side pieces, B, being detached and laid aside. The side pieces, B, may in some cases, however, be attached to the top and bottom pieces A, in which case they can be disposed under the folds $a\ a$ on the compression of the bale.

The usual bale hoops and ties are relied upon to secure the covering transversely, as shown.

To facilitate the handling of the bale, the top and bottom pieces A of the covering are provided at opposite sides with rope loops $n$, and ready inspection of the contents of the bale is permitted by the formation of elongated openings $p$ in the pieces A and B of the covering. The object of making the covering in a number of pieces, as described, is to facilitate the application of these pieces to the press before the pressing of the bale and the dispensing of some of them when the bale is compressed, and it will be evident that the pieces comprising the covering can be reused again and again, said pieces, when the covering is removed from the bale, being readily packed into very small compass for reshipment to the place where the cotton is baled.

There may be circumstances in which it will be sufficient to simply render fire or water proof the textile fabric of which the covering is composed; but in most cases it will be best to render the material both fire and water proof.

Having thus described my invention, I claim and desire to secure by Letters Patent—

1. The within-described covering or wrapping for cotton-bales, the same comprising the opposite side pieces and the top and bottom pieces, each of the latter having at one end a projecting strip with lacing-flap near the outer end, all substantially as specified.

2. The within-described covering or wrapping for cotton-bales, the same consisting of the opposite side pieces and the top and bottom pieces, each having at one end a projecting strip with inner and outer lacing-flaps, all substantially as specified.

In testimony whereof I have signed my name to this specification in the presence of two subscribing witnesses.

ALBERT S. RANLETT.

Witnesses:
  D. I. DOWERS,
  OVIDE L. LE BLANC.